E. H. JANNEY.
Car-Coupling.
No. 212,703. Patented Feb. 25, 1879.
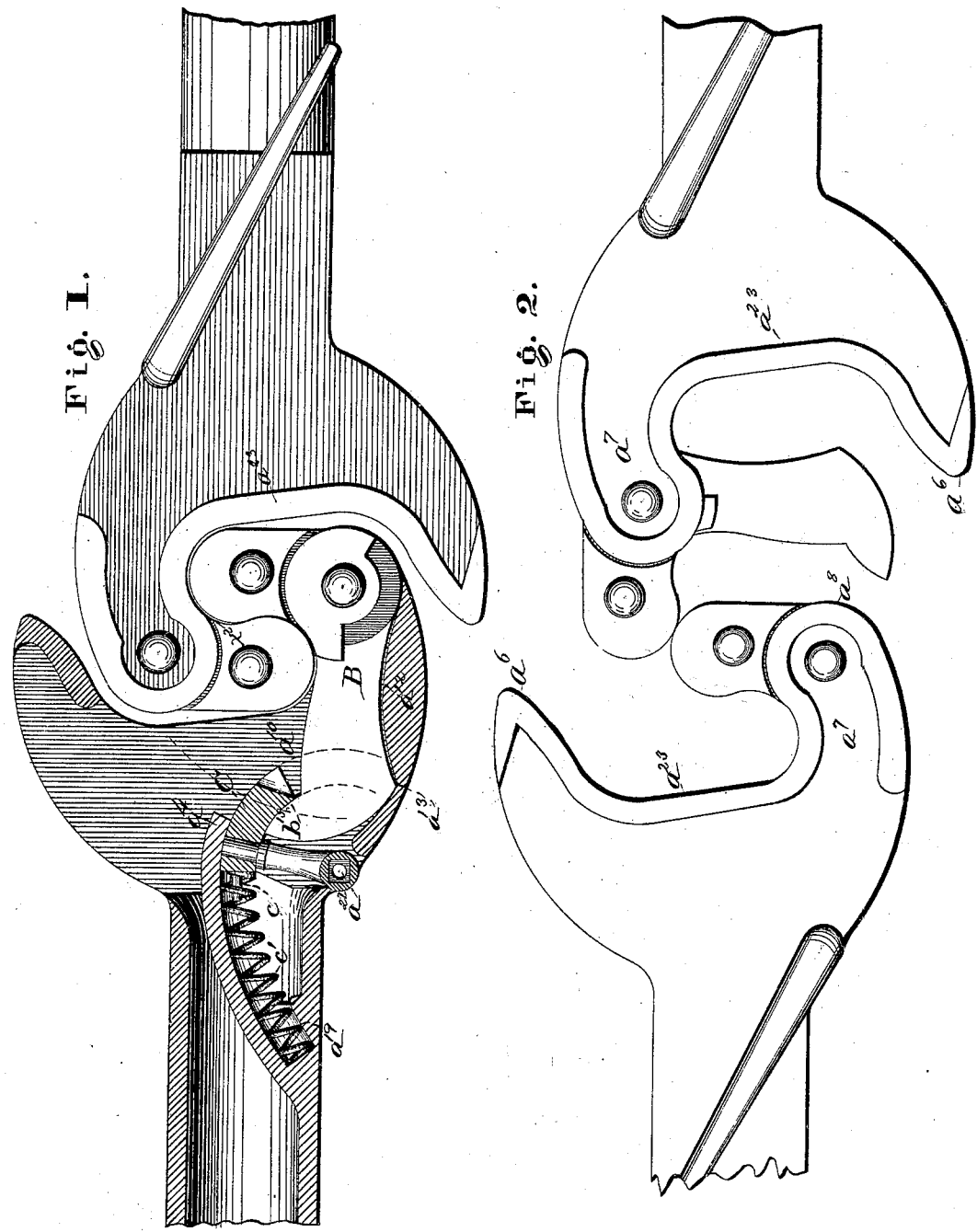
WITNESSES:
Theodore S. West
Mamie C. Stallings
INVENTOR:
ELI H. JANNEY,
BY
H. W. Beadle & Co.
ATTORNEYS.

5 Sheets—Sheet 2.
E. H. JANNEY.
Car-Coupling.
No. 212,703. Patented Feb. 25, 1879.
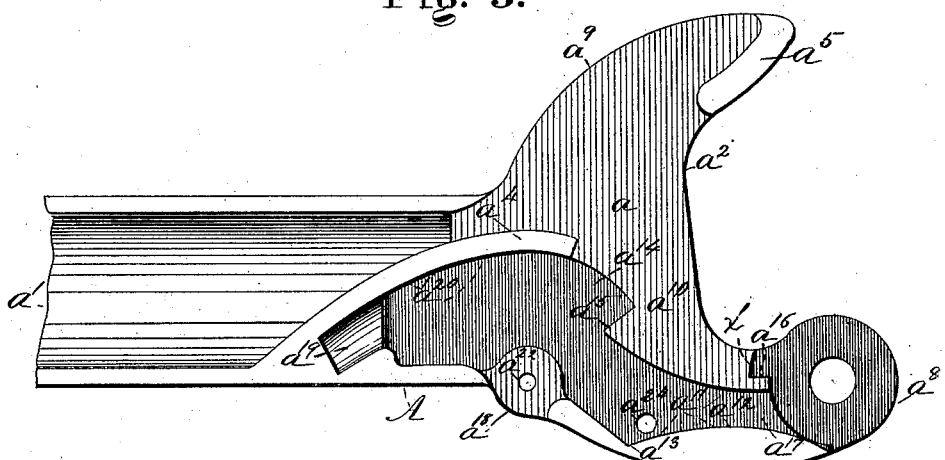
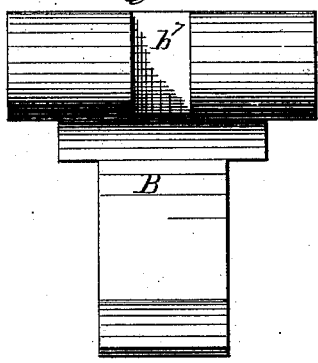
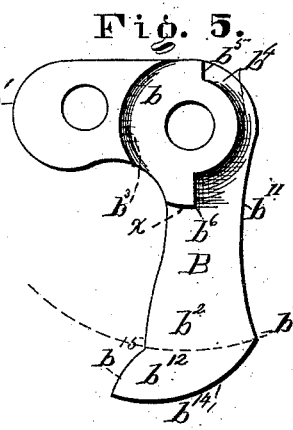
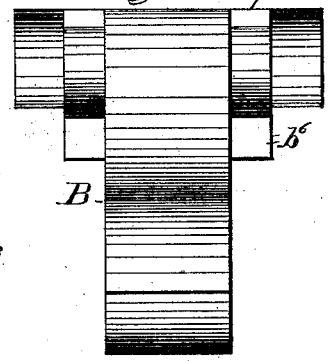
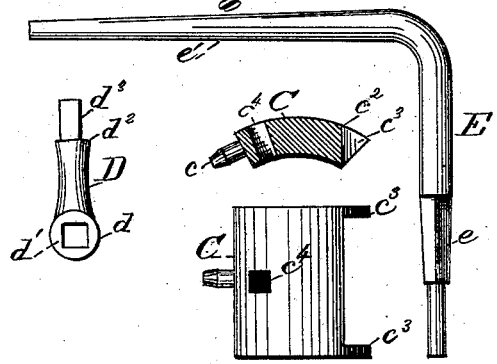
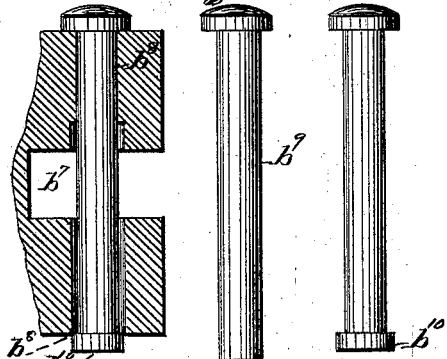
WITNESSES:
Mamie E. Stallings
Cornelius Cox
INVENTOR:
ELI H. JANNEY,
BY
H. W. Beadle & Co
ATTORNEYS.

E. H. JANNEY.
Car-Coupling.
No. 212,703. Patented Feb. 25, 1879.
5 Sheets—Sheet 3.
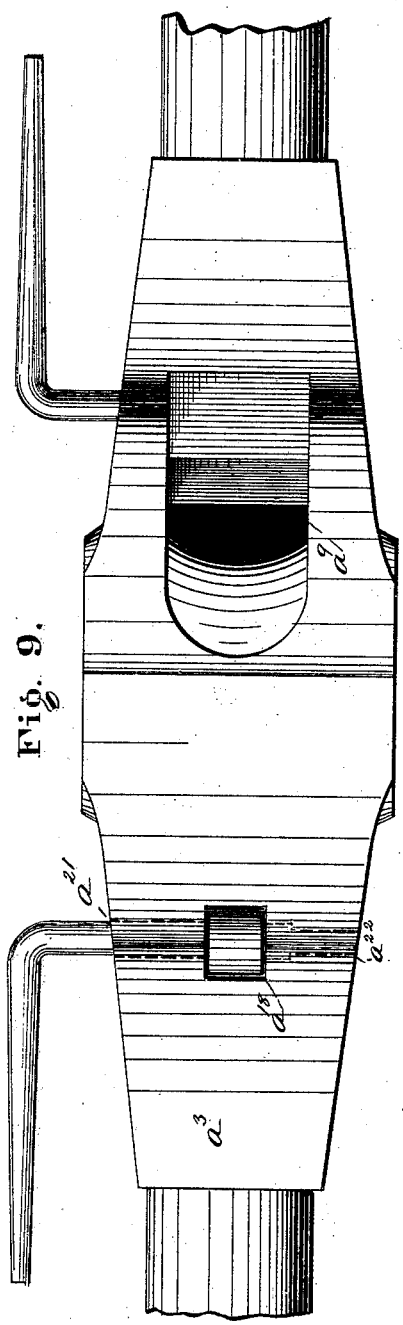
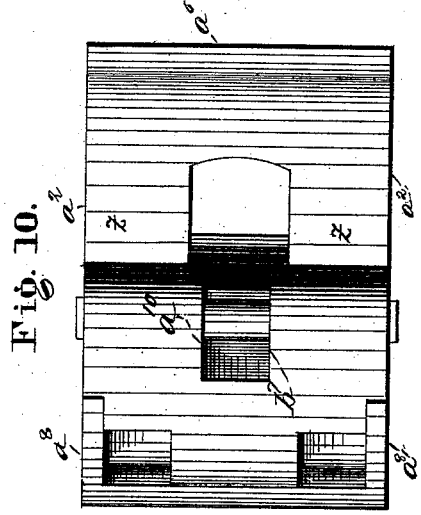
WITNESSES:
Mamie E. Stallings
Cornelius Cox
INVENTOR:
ELI H. JANNEY,
BY
H. W. Beadle & Co
ATTORNEYS.

E. H. JANNEY.
Car-Coupling.
No. 212,703. Patented Feb. 25, 1879.
5 Sheets—Sheet 4.
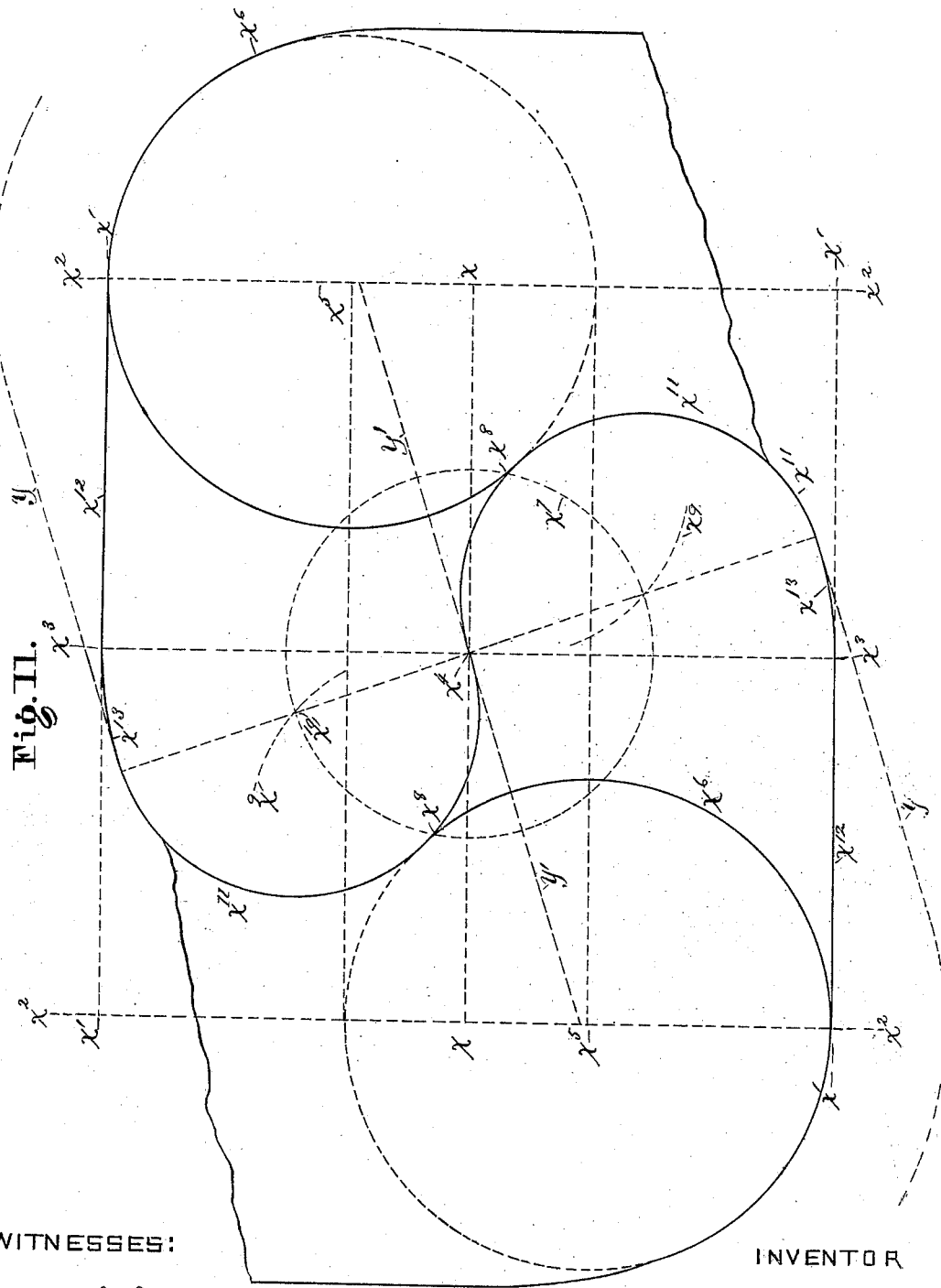
Fig. II.
WITNESSES:
Mamie B. Stallings.
Cornelius Cox.
INVENTOR
ELI H. JANNEY
BY
H. W. Beadle & Co
ATTORNEYS.

E. H. JANNEY.
Car-Coupling.
No. 212,703. Patented Feb. 25, 1879.
Fig. 12.
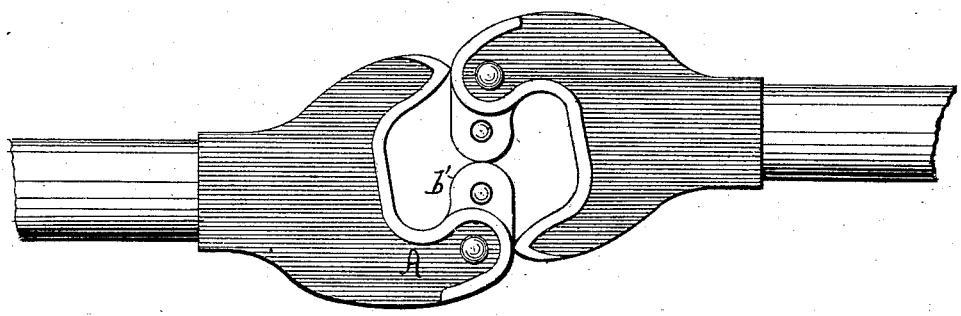
Fig. 13.
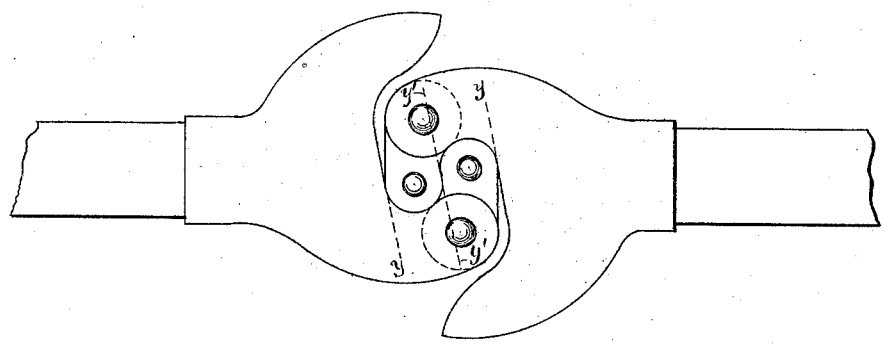
Fig. 14.
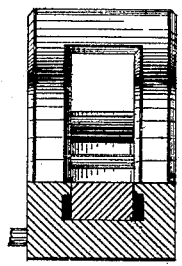 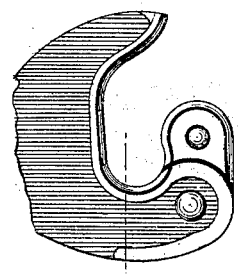
Fig. 15.
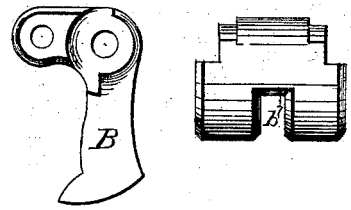
WITNESSES:
Mamie W. Stallings
Cornelius Cox
INVENTOR:
ELI H. JANNEY,
BY
H. W. Beadle & Co
ATTORNEYS.

UNITED STATES PATENT OFFICE.

ELI H. JANNEY, OF ALEXANDRIA, VIRGINIA, ASSIGNOR TO THE JANNEY CAR COUPLING COMPANY, OF SAME PLACE.

IMPROVEMENT IN CAR-COUPLINGS.

Specification forming part of Letters Patent No. 212,703, dated February 25, 1879; application filed May 23, 1877.

*To all whom it may concern:*

Be it known that I, ELI H. JANNEY, of Alexandria, in the county of Alexandria and State of Virginia, have invented a new and useful Improvement in Car-Couplings; and I do hereby declare that the following is a full and exact description of the same, reference being had to the accompanying drawings, and to the letters of reference marked thereon.

This invention is an improvement upon the couplings covered by my Letters Patent of April 29, 1873, No. 138,405, and October 20, 1874, No. 156,024; and it consists, mainly, in certain novel details of construction, by means of which the coupling is made more efficient in action and its durability is increased.

In the drawings, Figure 1 represents a plan view of two adjacent couplings as they appear when united, one of which is shown partially in section; Fig. 2, a plan view as they appear in the act of coupling or uncoupling; Figs. 3, 4, 5, 6, 7, and 8, views of various parts detached; Fig. 9, a side elevation of the couplings united; Fig. 10, a front-end elevation of a single coupling; Fig. 11, a diagram representing the manner of laying out a coupling; Fig. 12, a plan view of two couplings buffing against each other when it is not desired to unite the same; Fig. 13, a diagram showing the inclined planes upon which the couplings move in buffing, and Figs. 14 and 15 views of the draw-head and hook with beveled edges to prevent the parts from catching in vertical movements.

To enable others skilled in the art to make and use my invention, I will now proceed to describe fully its construction and manner of operation.

For convenience and clearness of description the several parts will be referred to under separate heads, as follows: first, the draw-head; second, the rotating hook; and, third, the mechanism for locking and unlocking the hook.

1. *The draw-head.*—A, Fig. 3, represents a casting, of proper material and size, consisting, mainly, of an enlarged head portion, $a$, supporting the coupling devices, and the rearwardly-extending cylindrical stem or shaft $a^1$, by means of which the draw-head is properly attached to the car.

The head portion $a$, it will be observed, consists, mainly, of an upper and lower plate, $a^2$ $a^2$, Fig. 10, united upon one side by a side plate, $a^3$, Figs. 3 and 9, the edge lines of which diverge as they extend from rear to front, and upon the other side by a plate or rib, $a^4$, Fig. 3, and the connecting-piece $a^5$, as shown.

The head portion $a$ also, it will be observed, is provided at its front end, upon one side of a longitudinal vertical plane, with a pyramidal projection, $a^6$, Figs. 2 and 10, extending from top to bottom, and serving as a guard and guiding-arm, and upon the other side with a curved extension, $a^7$, Fig. 2, terminating above and below in circular ears $a^8$, Fig. 3, as shown.

$a^9$, Fig. 9, represents a recess or hollow portion formed in the coupling, for the purpose of saving metal and reducing the weight. $a^{10}$, Fig. 10, represents the main recess, for holding the long arm of the hook, and the devices for locking and unlocking the same. $a^{11}$, Fig. 3, represents the inner face of the side wall of the main recess, which is provided with a swell or projection, $a^{12}$, and a recess, $a^{13}$, as shown. $a^{14}$, Fig. 3, represents recesses formed in the inner faces of the side walls, which terminate at their front ends in the shoulders $a^{15}$, which limits the movement of the catch or locking block in a forward direction, as shown in Fig. 1. $a^{16}$, Fig. 3, represents shoulders forming stops, by means of which, in connection with other devices, the movement of the hook in a backward direction is arrested at the proper point. $a^{17}$ represents a passage way opening into the interior recess, by means of which the catch or locking block may be readily inserted into place when desired. $a^{18}$, Fig. 9, represents a square opening formed in one side of the draw-head, through which the lever-arm is inserted into its place. $a^{19}$, Figs. 1 and 3, represents a recess for holding the rear end of the coiled spring, and $a^{20}$ the inner face of wall $a^4$, forming a bearing for the catch or locking block in its movement, as shown. $a^{21}$ $a^{22}$, Fig. 9, represent vertical openings formed in the upper and lower plates of the draw-head, in line with the square opening $a^{18}$, as shown, the upper one of which is larger in diameter than the lower, for purposes hereinafter explained.

The front edges of the head portion of the draw-head are beveled, as shown in Fig. 14, for purposes hereinafter explained.

$a^{23}$, Figs. 1 and 2, represents a rib or flange formed upon the front edges of the upper and lower plates, as shown, by means of which depth of face is obtained without material increase in weight. $a^{24}$, Fig. 3, represents an opening in the bottom plate of the draw-head, through which any moisture which may enter the same may be discharged.

2. *The rotating hook.*—B, Figs. 1 and 5, represents the rotating hook, consisting of a casting having the pivot center portion $b$, head $b^1$, and right-angled arm $b^2$, as shown. $b^3$ represents a recess formed upon each side of the central portion of the hook, which is adapted to receive the corresponding ear $a^9$ of the draw-head. $b^4$ represents a recess upon each end of the central portion, which terminates at one end in the shoulder $b^5$ and at the other in the shoulder $b^6$, both of which form stops, by means of which the movement of the hook, when in place, is properly limited in each direction. $b^7$, Figs. 4, 10, and 15, represents a transverse longitudinal opening in the head of the hook, which is adapted to receive, when circumstances require it, the link of the ordinary coupling. $b^8$ $b^8$, Fig. 8, represent vertical openings adapted to receive a link-pin, as shown, the upper one of which is less in diameter than the lower, with the exception of a short length at its lower end. $b^9$ represents the link-pin, the shank of which corresponds in diameter with that of the upper portion of the upper opening, so as to move freely therein. $b^{10}$ represents a head or enlargement formed upon the lower end of the pin after it is inserted in place, which exceeds in diameter that of the smaller portion of the upper opening, by means of which the pin is secured against entire removal, but is free to move vertically to admit the link and secure the same in place. $b^{11}$, Fig. 5, represents the rear side of the long arm of the hook, which corresponds accurately in outline with the inner face, $a^{11}$, Fig. 3, of the side wall of the draw-head, as shown in Fig. 1. $b^{12}$, Fig. 5, represents the rear end of the long arm of the hook, consisting of a triangular portion, projecting rearward from the arc of circle $b^{13}$, struck from the pivot center of the hook, as shown, which is provided with a curved bearing-face, $b^{14}$, for purposes hereinafter explained. $b^{15}$, Figs. 1 and 5, represents a bearing-face, the outline of which is curved to correspond with the arc of a circle struck from the pivot-point $a^{22}$ as a center, for purposes hereinafter explained.

3. *The mechanism for locking and unlocking the hook.*—C, Figs. 1 and 7, represents a catch or locking block, consisting of a segmental block of proper length and width, which is provided at one end with a projecting stud or pin, $c$, adapted to hold the front end of the spring $c^1$, as shown in Fig. 1, and at the other end with an inclined face, $c^2$, and projecting shoulders $c^3$ $c^3$, as shown in Fig. 7. The block itself, it will be observed, forms the segment of a circle struck from the pivot-point $a^{22}$ as a center.

$c^4$, Fig. 7, represents a proper opening adapted to receive the stud or pin $d^3$ of the lever-arm, as shown. D, Fig. 7, represents a lever-arm having at one end a head portion, $d$, with a square opening or recess, $d^1$, adapted to receive the corresponding angular portion of the actuating-lever, and at the other with the shoulder $d^2$ and the stud or pin $d^3$, adapted to rest in the recess $c^4$ of the catch-block, as shown. E, Fig. 7, represents the actuating-lever, held in the bearings $a^{21}$ $a^{22}$ in the draw-head, which is removably connected to the lever-arm D by an angular portion, $e$, resting in the corresponding recess $d^1$, as shown. $e'$ represents a bent extension, by means of which the lever is made convenient for operation, either directly by the hand or indirectly by any proper system of levers.

It will be observed that the lower end of the vertical portion of the lever is made smaller than the upper, this construction being preferred in order that it may be readily inserted in place.

The angular portion $e$ also is made tapering in form in order that it may be inserted readily into position, and also be tightened in its socket by driving, for the purpose of firmly securing it in place.

The parts, when united to form a coupling, are represented in Fig. 1.

The relations existing between the parts will now be described.

The draw-head is secured at its rear end, in any proper manner, to the car. Its front end supports the coupling devices, and also serves as a guide and buffer, as will be hereinafter described.

The recesses $b^3$ $b^4$, Fig. 5, of the pivot portion of the hook are arcs of concentric circles, and so also are the corresponding parts of the draw-head against which they bear.

The shoulder $b^6$, Fig. 5, it will be observed, is provided with a curved face, $x$, which is an arc of a circle struck from the pivot-center of the hook. This face, it will be observed, turns into a corresponding recess, $x^1$, Fig. 3, in the draw-head when the long arm turns backward, and when in this position tends to resist movement in a direct longitudinal line in a rearward direction.

The rear side of the long arm of the hook corresponds accurately in outline with the inner wall of the draw-head, against which it rests, as shown in Fig. 1, by means of which the corresponding recesses and projections are caused to interlock, so that the disengagement of the parts cannot occur without the lateral movement of the hook-arm. By this means a portion of the longitudinal strain is transferred to the solid portions of the draw-head, and hence the pivot-pin is relieved to a corresponding extent.

The construction of the rotary hook, also, and the parts by which it is held, is such that when longitudinal strain is exerted upon it it will be entirely, or nearly so, borne by the solid portions of the draw-head, and not by the pivot-pin of the hook.

The construction by means of which this result is produced is as follows: $x^2$, Fig. 1, represents a point of the head portion of the hook, which extends rearward behind the curve of the ear of the draw-head, as shown. By this means the solid and moving parts are so interlocked that disengagement cannot be effected by longitudinal strain without lateral movement, which cannot occur; also, the construction of the point of the hook $b^{15}$, Fig. 1, and the part against which it bears, is such that a similar effect is produced, one part overhanging the other, so that disengagement cannot be effected by a longitudinal strain without lateral movement. The catch or locking block, it will be observed, when in the proper position to lock the hook-arm, is supported almost entirely by bearing-faces in the solid sides of the draw-head, so that no severe strain comes upon the wall or rib $a^4$, which guides it in its movement. This recess and the adjacent end of the wall constitute an arc of the same circle, as shown; but the rear end of the wall, which assists in retaining the spring in place, is flattened or made to approach more nearly a straight line, this construction being employed to give the spring more perfect support, and to enable it to act more advantageously in moving the locking-block.

The catch or locking block is concentrically curved to correspond with the recess $a^{14}$, Fig. 3, and the ways in which it moves. The bearing-face $b^{15}$ of the point of the hook which bears against the block when the latter is in its locked position also coincides with this circle, from which it follows that the catch-block may be removed from contact with the bearing-face of the hook when it is desired to release the latter without the exercise of greater power than is required to overcome the friction of the moving parts, while any departure from this curve would make it necessary to move the hook-arm laterally, which action could not be performed without overcoming the entire draft-strain on the coupling.

The locking-block, it will be observed, also is not rigidly connected to the lever-arm, the stud or pin $d^3$ of the latter being simply held in the recess $c^4$ without being otherwise secured. From this construction it follows that when the block is in position to lock the hook, and consequently is forced by the pressure of the draft-strain strongly back against its bearings, it will be free to move laterally upon the stud or pin under the strain without affecting in any degree the lever-arm. As this stud or pin, however, snugly fits the recess in the block, it follows that the two are firmly united, so that the block may be readily moved, when desired, in a longitudinal direction. The shoulder also of the lever-arm serves, in connection with the ways, to keep the block always in its proper position.

It will be observed, also, as indicated in Fig. 1, that the circle in which the locking-block rests cuts the circle of the hook's movement exactly at right angles thereto, so that the pressure exerted upon the block by the hook is exactly at right angles to the line of its movement, and consequently there is no tendency to force it to either side.

The face $x^{13}$, Fig. 11, of the front end of the head of the hook is a transverse vertical plane located at right angles to the center line of the coupling, by means of which it is adapted to form a proper buffing-surface when the draw-head is connected to an ordinary coupling, and when, also, the hooks of adjacent couplings come together in a closed position, as shown in Fig. 12.

The faces, also, of the recess of the draw-head form a buffing-surface when two couplings are united. These faces, it will be observed, form parallel inclined planes, as indicated by the lines $y\ y$, Fig. 13. The adjacent inner faces of the hooks, also, it will be observed, meet upon a central line parallel to these planes, as indicated by the line $y'$, Fig. 13.

From this construction it follows that when the hooks are crowded together in buffing they slide necessarily upon these inclined planes in a lateral direction until further movement is arrested by the guard-arm. As this lateral movement takes place, however, the adjacent faces of the hooks change position also, so that the projection of the one, instead of resting in the recess of the other, approaches and finally bears upon the projection of the other, the construction being such that, although movement takes place, no actual separation of the parts occurs, and hence no bumping or jarring is possible.

The guard-arm, it will be observed, is provided with a curved inner face, by means of which it is adapted to guide an approaching hook properly into place. The hook also is provided with proper curved surfaces, which tend when coming in contact with the guide-arm to give it proper direction. In fact, it will be observed that all the projecting surfaces which can by any possibility come in contact with each other in the act of coupling are so curved as to mutually act to guide properly the parts into place.

It will be observed, also, as shown in Fig. 10, that the link-slot is less in width than the faces $z$ of the draw-head, which come in contact therewith when the coupling is effected, this construction being employed for the purpose of preventing, under any circumstances, any portion of one draw head and hook from entering the slot of the other, and becoming jammed.

It will be observed, also, that the arm of the hook, as shown in Figs. 4 and 6, is made greater in width than the link-slot, for the same purpose.

It will be observed, also, that the head of the hook above and below the link-slot is made greater in width than the central opening of the draw-head, as shown in Fig. 10, for a similar purpose.

The edges also of the link-slot opening, and the top and bottom edges of the hook, as shown in Fig. 15, are beveled, so that the couplings may not catch or hang in the vertical movements of the car.

The peculiar manner of laying out a coupling is important, and the same will now be described.

$x\ x$, Fig. 11, represent a center line, and $x^1$ $x^1$ $x^1$ $x^1$ lines parallel thereto, drawn at a distance of three inches. $x^2$ $x^2$ $x^2$ $x^2$ represent lines at right angles to the first series, which are drawn six inches apart. $x^3$ $x^3$ represent a transverse center line between these lines.

The lines $x^1$ $x^2$, it will be observed, form a perfect square with a side of six inches.

By means of this the lines of construction for the various parts can be readily obtained, and also their relative positions, as follows: Upon the lines $x^1$, upon opposite sides, take a point, $x^5$, two inches from the line $x^2$, and describe the circle $x^6$ with a radius of two inches. From the center $x^4$ describe the circle $x^7$ with a radius of one and one-half inches. From the center $x^8$, where the circles $x^6$ and $x^7$ cut each other, describe the arc $x^9$ with a radius of one and a half inch. From the center $x^{10}$, where the circles $x^7$ and $x^9$ cut each other, describe the semicircles $x^{11}$, which form the heads of the hooks.

It will be observed that the circles $x^6$ form the pivot portions of the hook, and the semicircles $x^{11}$ the adjacent head portions of the hooks. These two are united to complete this portion of the coupling by a straight line, $x^{12}$, and an arc, $x^{13}$, of a circle struck from the center $x^4$ with a radius equal to the diameter of the circle $x^{11}$.

The coupling, of course, may be made of any proper material. If desired, it may be constructed of wrought metal, in which case the parts may be first stamped out by dies of proper shape, and afterward be properly united.

If desired, instead of the automatic locking-block, a simple pin may be dropped in front of the hook-arm for the purpose of locking the same in place; or, if desired, the spring $c^1$ may be entirely removed and the locking-block be employed to support a locking-pin until the hook-arm in its backward movement releases the same and permits it to fall, thus making the action automatic.

The described changes in construction renders the coupling more perfect in its operation and simplify somewhat its manufacture. It is also much better adapted for use with the ordinary draw-head, as the ordinary link and pin may be readily employed.

Having thus fully described my invention, what I claim as new, and desire to secure by Letters Patent, is—

1. In combination with the independent locking-block C, the loosely-connected lever D, the construction being such that the block is capable of movement upon the stud of the lever, as and for the purpose described.

2. In combination with the block C, having the opening $c^4$, the lever D, having the shoulder $d^2$ and stud $d^3$, as described.

3. In combination with the draw-head having the opening $a^{18}$, the lever D and the removable lever E, the construction being such that the parts may be readily removed and inserted in place when desired.

4. In combination with the relatively-fixed lever D, the locking-block C, forming a segment of a circle struck from the pivot-point of the lever, and the recess and ways coinciding with this circle, as described.

5. In combination with the inner wall, $a^{11}$, of the draw-head having projection $a^{12}$ and recess $a^{13}$, the hook-arm having a corresponding projection and recess, substantially as described.

6. In combination with the lever-arm D, having the angular slot $d^1$, and the draw-head having proper openings of different diameters, the removable lever E, having the tapering portion $e$, as described.

7. In combination with a catch or locking block adapted to move on the arc of a circle, a hook, B, having a bearing-face, $b^{15}$, coinciding with said circle, the construction being such that the block may be disengaged from the hook without the exercise of greater power than is required to overcome the friction, substantially as described.

8. A coupling substantially as described—that is, a hook-head, $b^1$, and draw-head A, having a continuous outline formed of two equal semicircles in reversed positions, as shown in Figs. 11 and 12.

9. The coupling described, having the faces $a^2$ formed upon angle-line $y\ y$, Fig. 13, corresponding with the central line upon which the coupling moves in buffing, substantially as described.

This specification signed and witnessed this 21st day of May, 1877.

E. H. JANNEY.

Witnesses:
MAMIE E. STALLINGS,
H. W. BEADLE.